United States Patent Office 2,756,236
Patented July 24, 1956

2,756,236

3-(HYDROXYCARBAMYL)METHYL-1-METHYL PYRIDINIUM IODIDE

Thomas Samuel Gardner, Rutherford, N. J., assignor to Hoffmann-La Roche Inc., Nutley, N. J., a corporation of New Jersey No Drawing. Application July 22, 1955,
Serial No. 523,924

1 Claim. (Cl. 260—295.5)

This invention relates to 3-(hydroxycarbamyl)methyl-1-methyl-pyridinium iodide.

The novel compound of this invention is synthesized by reacting 3-pyridineacetohydroxamic acid with methyl iodide, preferably in a solvent such as methanol. 3-pyridineacetohydroxamic acid may be prepared by reacting the methyl ester of 3-pyridineacetic acid with hydroxylamine hydrochloride in a methanol solution of sodium methoxide, evaporating the solvent and crystallizing the residue from ethanol.

3-(hydroxycarbamyl)methyl-1-methylpyridinium iodide is useful as a reactivator of cholinesterase after inhibition of phosphorus esters such as tetraethyl pyrophosphate.

*Example*

2 g. of 3-pyridineacetohydroxamic acid were suspended in ether and an excess of methyl iodide was added. Sufficient methanol to dissolve the suspended material was added and the solution was permitted to stand for 18 hours at room temperature. During this period the solution turned red. The solution was refluxed for one-half hour, then concentrated by distillation in vacuo. Ether was added, whereupon a light brown product crystallized. The 3-(hydroxycarbamyl)methyl-1-methylpyridinium iodide was recrystallized from methanol, M. P. 165–166° C.

Calculated for $C_8H_{11}IN_2O_2$: C, 32.7; H, 3.7. Found: C, 32.9; H, 3.8.

I claim:

3 - (hydroxycarbamyl)methyl - 1 - methylpyridinium iodide.

No references cited.